(12) United States Patent
Kubo

(10) Patent No.: US 8,428,044 B2
(45) Date of Patent: Apr. 23, 2013

(54) MOBILE APPARATUS

(75) Inventor: Yoshiyuki Kubo, Hino (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 970 days.

(21) Appl. No.: 12/403,545

(22) Filed: Mar. 13, 2009

(65) Prior Publication Data

US 2010/0075671 A1 Mar. 25, 2010

(30) Foreign Application Priority Data

Sep. 25, 2008 (JP) ................ P2008-246746

(51) Int. Cl.
*H04J 3/06* (2006.01)
*H04J 3/00* (2006.01)
*H04B 7/00* (2006.01)
*H04W 4/00* (2009.01)

(52) U.S. Cl.
USPC ................. 370/350; 455/434; 455/435.2

(58) Field of Classification Search .............. None
See application file for complete search history.

(56) References Cited

U.S. PATENT DOCUMENTS

2006/0189312 A1* 8/2006 Kubo et al. ............ 455/434
2008/0198811 A1* 8/2008 Deshpande et al. ......... 370/332

FOREIGN PATENT DOCUMENTS

JP 2004-297784 * 10/2004
JP 2007-274152 A 10/2007

OTHER PUBLICATIONS

CDG, Recommended System Selection Requirements for 1X and 1xEV-DO-Capable Terminals, Mar. 2007, CDG Document 143, version 1.1, all pages.*
CDG MRU Table; Ref. Doc. 143; Aug. 16, 2006; (2 pages).
JP Office Action mailed on May 22, 2012 as received in application No. 2008-246746.

* cited by examiner

*Primary Examiner* — Chirag Shah
*Assistant Examiner* — Srinivasa Reddivalam
(74) *Attorney, Agent, or Firm* — Maschoff Brennan

(57) ABSTRACT

According to an aspect of the invention, there is provided a mobile apparatus including: a first communication module configured to communicate with a first base station of a first mobile communications network through a first radio access method; a second communication module configured to communicate with a second base station of a second mobile communications network through a second radio access method, the second communication module configured to provide a circuit switching service; a memory; and a control module configured to control the memory to store information about the second mobile communications network when the first communication module carries out a waiting processing and the second communication module carries out a synchronization processing.

17 Claims, 13 Drawing Sheets

FIG.3

| LIST NUMBER | NETWORK ID | RADIO ACCESS METHOD (ACCESS SYSTEM) | FREQUENCY BAND | CENTRAL FREQUENCY |
|---|---|---|---|---|
| 0 | aaa/bbb | cdma2000 | 1900MHz BAND | 1915MHz |
| 1 | ccc/ddd | LTE | 2100MHz BAND | 2130MHz |
| 2 | eee/fff | cdma2000 | 2100MHz BAND | 2120MHz |
| ... | ... | ... | ... | ... |
| n-2 | rrr/sss | cdma2000 | 1900MHz BAND | 1905MHz |
| n-1 | ttt/uuu | LTE | 2100MHz BAND | 2110MHz |

FIG.5A
| LIST NUMBER | NETWORK ID | RADIO ACCESS METHOD (ACCESS SYSTEM) | FREQUENCY BAND | CENTRAL FREQUENCY |
|---|---|---|---|---|
| 0 | aaa/bbb | cdma2000 | 1900MHz BAND | 1915MHz |
| 1 | ccc/ddd | LTE | 2100MHz BAND | 2130MHz |
| 2 | eee/fff | cdma2000 | 2100MHz BAND | 2120MHz |
| ... | ... | ... | ... | ... |
| n-2 | rrr/sss | cdma2000 | 1900MHz BAND | 1905MHz |
| n-1 | ttt/uuu | LTE | 2100MHz BAND | 2110MHz |
(PREUPDATE NUMBER)
(n-2)
(0)
(1)
...
(n-3)
(n-1)
FIG.5B
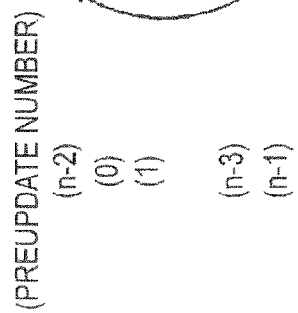
FIG.5C
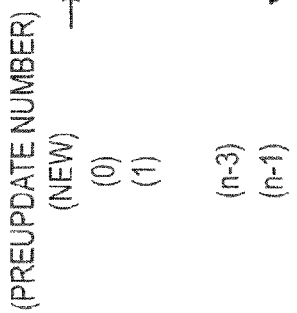

FIG. 7A

| LIST NUMBER | NETWORK ID | RADIO ACCESS METHOD (ACCESS SYSTEM) | FREQUENCY BAND | CENTRAL FREQUENCY |
|---|---|---|---|---|
| 0 | aaa/bbb | LTE | 2100MHz BAND | 2130MHz |
| 1 | ccc/ddd | cdma2000 | 1900MHz BAND | 1915MHz |
| 2 | eee/fff | cdma2000 | 2100MHz BAND | 2120MHz |
| ... | ... | ... | ... | ... |
| n-2 | aaa/bbb | cdma2000 | 1900MHz BAND | 1905MHz |
| n-1 | vvv/www | LTE | 2100MHz BAND | 2110MHz |

FIG. 7B

| LIST NUMBER | NETWORK ID | RADIO ACCESS METHOD (ACCESS SYSTEM) | FREQUENCY BAND | CENTRAL FREQUENCY | (PREUPDATE NUMBER) |
|---|---|---|---|---|---|
| 0 | aaa/bbb | cdma2000 | 1900MHz BAND | 1945MHz | (NEW) |
| 1 | aaa/bbb | LTE | 2100MHz BAND | 2130MHz | (0) |
| 2 | aaa/bbb | cdma2000 | 1900MHz BAND | 1905MHz | (n-2) |
| ... | ... | ... | ... | ... | ... |
| n-2 | ppp/qqq | LTE | 2100MHz BAND | 2140MHz | (n-3) |
| n-1 | vvv/www | LTE | 2100MHz BAND | 2110MHz | (n-1) |

MOBILE APPARATUS

CROSS-REFERENCE TO RELATED APPLICATIONS

The entire disclosure of Japanese Patent Application No. 2008-246746 filed on Sep. 25, 2008, including specification, claims, drawings and abstract is incorporated herein by reference in its entirety.

BACKGROUND

1. Field of the Invention

One aspect of the present invention relates to a mobile apparatus.

2. Description of the Related Art

A wireless communication apparatus selects a mobile communications network to start a connection when it is turned ON. At this time, a long time is taken for searching a mobile communications network which can be connected, and an amount of power consumption is also large. Therefore, the mobile communications network is selected by using a Most Recently Used (MRU) list for storing information about a mode which indicates which radio access technology is used, a frequency band and a used channel number for a mobile communications network to which a mobile apparatus 1 has recently connected (see "CDMA Development Group Document #143". It is note that MRU list is called as MRU table in that document). Information about the connected mobile communications network is added to the MRU when a synchronization with a base station belonging to the mobile communications network and reception of information necessary for standby are completed or when the mobile apparatus is located within a coverage of a mobile communications network whose System Identification (SID) and Network identification (NID) are changed.

Moreover, there has also been proposed a technique for storing information about a mobile communications network to be connected at a time when a power is OFF in order to rapidly select a mobile communications network at a time when the power is ON (see JP-A-2004-297784).

According to (DMA Development Group Document #143, information to access and establish connection to mobile communications network is registered in the MRU at a time when a synchronization with a mobile communications network and a receipt of information are completed. When a selection of the mobile communications network is to be performed by using the information registered in the MRU in a power-ON state, however, the selection cannot be accurately carried out in some cases. For example, when a power supply of the mobile apparatus is turned OFF and the apparatus is moved in a power-OFF state, and then the power supply of the apparatus is turned ON again in a moving destination in which a service is given through a different mobile communications network from a stored mobile communications network, the information stored in the MRU is not valid. For this reason, the stored information is to be sequentially selected by way of trial from an upper so that a connection to the wiring communication network is delayed.

On the other hand, in the invention described in JP A-2004-297784, information about a current mobile communications network is stored including not only above information which CDMA development group document says but also base station identification information when a power supply is to be turned OFF. However, it may not be desirable that the mobile communications network is selected by using information about a mobile communications network which is finally waited when a plurality of mobile communications networks using a plurality of wireless communication methods are present with their coverages overlapped. For example, in an integrated mobile communications system configured by coverage area including a base station through a Wide Band Code Division Multiple Access (WCDMA) and a base station through Global System for Mobile Communications (GSM), it is expected that only a waiting processing (A waiting processing is a standby processing to do various services via mobile communications network after discovering a base station to establish connection, for example, to originate a call, to wait for receiving an incoming call) through the WCDMA is performed and only information about the base station through the WCDMA is stored in the MRU when a power supply is turned OFF. Then, the mobile apparatus moves to another coverage area in which only GSM is present, i.e. there is no WCDMA, while the mobile apparatus is turned off. In this case, the information registered in the MRU is not useful any more because the MRU stores only information related to access to WCDMA and the MRU provides no information to acquire GSM system after moving that coverage area. Consequently, a useless search for a cell selection is occurred to cause a delay in a connection to a GSM cell.

SUMMARY

According to an aspect of the invention, there is provided a mobile apparatus including a first communication module configured to communicate with a first base station of a first mobile communications network through a first radio access method; a second communication module configured to communicate with a second base station of a second mobile communications network through a second radio access method, the second communication module configured to provide a circuit switching service; a memory; and a control module configured to control the memory to store information about the second mobile communications network when the first communication module carries out a waiting processing and the second communication module carries out a synchronization processing.

BRIEF DESCRIPTION OF THE DRAWINGS

Embodiment may be described in detail with reference to the accompanying drawings, in which:

FIG. 3 is a table showing an example of an MRU list stored in the mobile apparatus according to the embodiment of the invention;

FIGS. 5A to 5C are tables showing examples of a rearrangement of a rank in the MRU list of the mobile apparatus according to the embodiment of the invention;

FIGS. 7A and 7B are tables showing examples of the rearrangement of the rank in the MRU list of the mobile apparatus according to the embodiment of the invention;

DETAILED DESCRIPTION OF THE EMBODIMENTS

An embodiment according to the invention will be described below with reference to the drawings.

First Embodiment

A mobile apparatus according to an example of embodiments of the invention can synchronize plural types of wireless communication methods (which will be hereinafter referred to as radio access method). Description will be given by taking, as an example, a case in which two-type radio access methods are synchronized with each other. A first radio access method is a new radio access method where a communication speed provided to the terminal is high, however, coverage where a mobile apparatus is capable of wireless communication connection is limited because base stations are developing. On the other hand, a second radio access method serves to provide a circuit switching service and has commonly been used. The second radio access method is poorer in a communication speed as compared with the first radio access method and has a limitation of a service which can be provided, and coverage for a basic voice call is widely developed because the development of the base station is completed.

Figure 1:
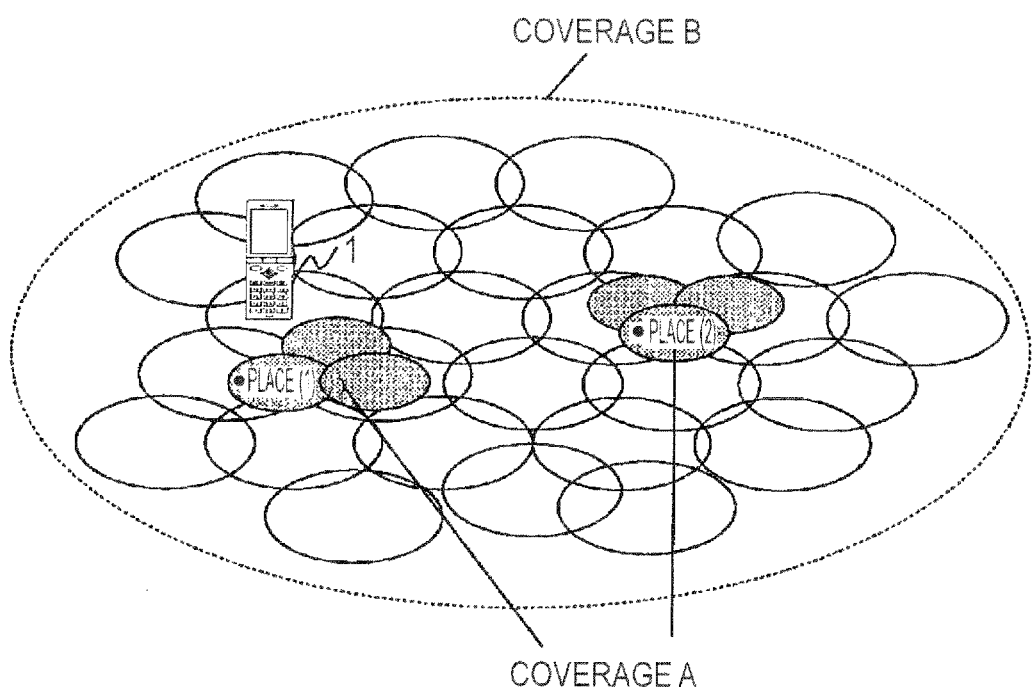
FIG. 1 is an exemplary diagram showing a relationship between coverage A capable of providing a communication through a new radio access method and coverage B capable of providing a communication through a conventional radio access method.

FIG. 1 shows coverage which is provided by a mobile communication system in which a mobile apparatus according to the invention performs a connection, and illustrates a relationship between coverage A capable of providing a communication through a new radio access method and coverage B capable of providing a communication through a conventional radio access method. As shown in FIG. 1, coverage B is provided within a wider coverage than coverage A and there are areas which are included in coverage B and are not included in coverage A.

Therefore, a mobile apparatus 1 can receive a service such as a voice call or a packet communication by carrying out a wireless connection to a base station (not shown) through a new radio access method or a conventional radio access method corresponding to a location area.

For example, a place (1) in FIG. 1 is included in both coverage A and coverage B. When the mobile apparatus 1 is in the place (1), therefore, it is possible to receive services from both the new radio access method and the conventional radio access method. At this time, the mobile apparatus 1 selects to carry out a communication through the new radio access method at a higher speed, performs waiting through the new radio access method and receives a service such as calling or incoming call. In addition, by acquiring a necessary synchronization processing (synchronization processing is a processing to maintain a timing of radio frames sent by a base station) for the conventional radio access method to prepare for starting the service through the conventional radio access method, it is possible to quickly carry out switching into the service through the conventional radio access method. The switching is occurs when a unique service to the conventional radio access method, for example, voice calling through services provided by radio communication network which uses circuit switching system (which will be hereinafter referred as circuit switching service) is to be started or when a movement to an outside of the area of the new radio access method is performed.

On the other hand, a place (2) in FIG. 1 is not included in the coverage A but is included in only the coverage B. For this reason, when the mobile apparatus 1 is in the place (2), the service of the new radio access method cannot be received. Therefore, in order to receive the service through the conventional radio access method, the mobile apparatus 1 performs a waiting processing by the conventional radio access method.

For example, the new radio access method is a Long Term Evolution (LTE) access method to be a 3.9th generation mobile communications system and the conventional radio access method is a cdma2000 access method or a WCDMA access method to be a third generation mobile communications system.

Figure 2:
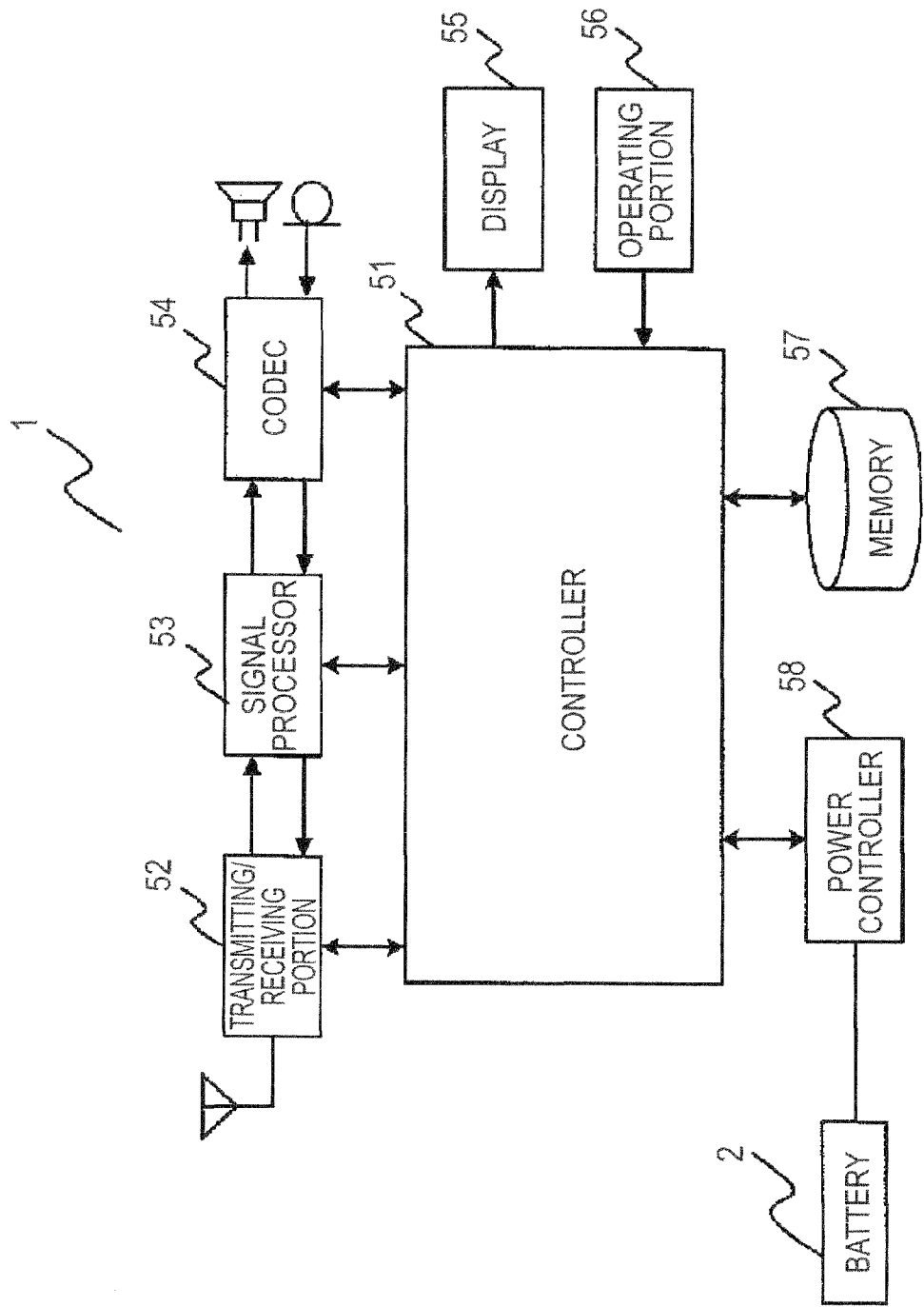
FIG. 2 is an exemplary block diagram showing a configuration of a mobile apparatus according to an embodiment of the invention.

FIG. 2 is a block diagram showing a configuration of the mobile apparatus according to the embodiment. The mobile apparatus 1 according to the embodiment is operated with a supply of a power from a battery 2, and has a controller 51, a transmitting/receiving portion 52, a signal processor 53, a Codec 54, a display 55, an operating portion 56, a memory 57, a power controller 58, and a timer.

The controller 51 controls the whole mobile apparatus 1. The controller 51 is configured by a CPU, an ROM and an RAM. The CPU performs various processings according to a program stored in the ROM or various application programs and controls programs including an operating system (OS) loaded onto the RAM from the memory 57, and furthermore, generates various control signals and supplies them to each portion, thereby chiefly controlling the mobile apparatus 1.

The mobile apparatus 1 can carry out a communication through two types of access methods including the new radio access method and the conventional radio access method as described above, and the transmitting/receiving portion 52 and the signal processor 53 correspond to both of them.

The transmitting/receiving portion 52 carries out a wireless communication by the new radio access method or the conventional radio access method through an antenna together with a base station which is not shown. In a transmission of a signal from the transmitting/receiving portion 52, a radio signal having a carrier frequency specified by the controller 51 is generated based on a modulating signal generated in the signal processor 53, and an electromagnetic wave is transmitted from the antenna to the base station. When a signal is received from the base station, moreover, an electro-magnetic wave received through the antenna is converted into an electric signal and is down-converted into an intermediate frequency signal, and a quadrature demodulation is then carried out over the intermediate frequency signal and a baseband signal is thus output.

The signal processor 53 is configured by a Digital Signal Processor (DSP). When the signal processor 53 receives the baseband signal from the transmitting/receiving portion 52, a certain signal processing is carried out over the baseband signal so that packet data received in a certain transmission format are obtained. In receiving a PCM coded signal which is coded by the Codec 54, moreover, the signal processor 53 generates a modulating signal and outputs the modulating signal to the transmitting/receiving portion 52.

The Codec 54 decodes the PCM signal received from the signal processor 53 and outputs the decoded signal from a speaker. Moreover, the Codec 54 PCM codes an analog signal input from a microphone and outputs the PCM coded signal to the signal processor 53.

The display 55 is configured by a liquid crystal display and displays a character and an image according to a control given from the controller 51. The operating portion 56 is configured by operating keys, touch panels or touch sensors, for example, and inputs a signal corresponding to a user operation to the controller 51. The memory 57 is configured by a flash memory unit to be a nonvolatile memory which is electrically rewritable and erasable and a Hard Disc Drive (HDD), for example, and stores various application programs and various data groups which are to be performed by the CPU of the controller 51, a control program and control data of the mobile apparatus 1, and identification information assigned uniquely to the mobile apparatus 1 or a user. The power controller 58 measures a voltage of the battery 2 and controls a voltage of an electrical energy supplied from the battery 2.

The timer checks a current time.

When a power supply of the mobile apparatus 1 having the configuration described above is turned OFF, and the mobile apparatus 1 is detached from mobile communications system shown in FIG. 1, and then the power supply is then turned ON again, it is impossible to know which coverage the mobile apparatus 1 is located. At this time, even if the mobile apparatus 1 searches coverage A to be connected by the new radio access method, coverage A cannot be found in many cases because it has a small coverage as shown in FIG. 1. It is preferable to search coverage B to be developed by the conventional radio access method in order to have a higher possibility that the mobile apparatus 1 might be returned into coverage of the mobile communications system more quickly.

Therefore, the controller 51 carries out a processing for updating a most recently used list (MRU list) to be used for selecting a mobile communications network in order to enable a quick establishment of a connection to the system in next power-ON when the mobile apparatus 1 performs a processing for a detachment from the mobile communications network. The detachment is a process to tell a mobile communications network to stop mobile.

The MRU list serves to register information about the mobile communications network connected in such a timing that a receipt of necessary information for a synchronization with the mobile communications network and waiting is completed and can register network information to identify which mobile network operator is or which network area is (a network ID), a radio access method (a radio access technology, RAT) to be used, frequency band information to be used, and a central frequency to be used by the radio access method as shown in FIG. 3 (see "CDMA Development Group Document #143"). The mobile communications network information to be registered in the MRU list has a higher rank with a smaller number of the list and is selected with priority in the selection of the. Moreover, the mobile communications network information to be registered in the MRU list has an upper limit. It is assumed that "n" mobile communications network information can be registered.

A processing to be carried out when updating the MRU list with the detachment will be described with reference to FIG. 4.

When determining that a power OFF key operation or an offline mode (or so-called 'flight mode') selecting operation for carrying out a disconnection from the mobile communications system through the operating portion 56 is input, the controller 51 performs the detachment.

At this time, if the waiting is performed by the new radio access method, the controller 51 confirms whether or not the conventional radio access method carrying out a synchronization processing is present in addition to the new radio access method which is performing the waiting (S101). If the conventional radio access method is not present (No in S101), the processing for updating the MRU list is ended.

If the conventional radio access method taking the synchronization is present (Yes in S101), the controller 51 compares information about the conventional radio access method with information registered in the MRU list and determines whether there are coincident information or not (S102). The coincidence indicates that all information such as network information registered in the MRU list, a radio access method to be used, frequency band information to be used and a central frequency to be used by the radio access method are coincident with each other.

If the mobile communications network information about the conventional radio access method taking the synchronization is coincident with one of the mobile communications network information registered in the MRU list at the Step S102 (Yes in S102), the controller 51 changes any of the mobile communications network information registered in the MRU list which is coincident with the mobile communications network information about the conventional radio access method taking the synchronization so as to be a top (MRU[0]) of the list, and furthermore, rearranges the list number in ascending order of MRU[1], MRU[2] . . . for the other mobile communications network information stored in the MRU list (S103).

For example, when information shown in FIG. 5A is registered in the MRU list, the controller 51 sets the mobile communications network information of MRU[n-2] into MRU[0] and sequentially rearranges information other than MRU[n-2] registered in the MRU list as shown in FIG. 5B if it is determined that MRU[n-2] is coincident with the mobile communications network information about the conventional radio access method taking the synchronization at the Step S102.

On the other hand, if the mobile communications network information about the conventional radio access method taking the synchronization is not coincident with any of the mobile communications network information registered in the MRU list at the Step S102 (No in S102), the controller 51 registers the mobile communications network information about the conventional radio access method taking the synchronization in MRU[0] in the highest rank of the MRU list and sequentially rearranges the list number in ascending order of MRU[1], MRU[2] . . . for the mobile communications network information registered in the MRU list (S104). If new mobile communications network information is registered in the MRU list so that a limitation which can be stored in the MRU list is exceeded, moreover, mobile communications network information having a last number due to the rearrangement of the list number is deleted.

For example, in the case in which the mobile communications network information about the conventional radio access method taking the synchronization is newly registered when the information shown in FIG. 5A is registered in the MRU list, information is added to the top position as shown in FIG. 5C.

When a synchronization with the conventional radio access method as well as the new radio access method is taken through the MRU list update processing described above, the conventional radio access method can be registered in the MRU list.

Figure 6:
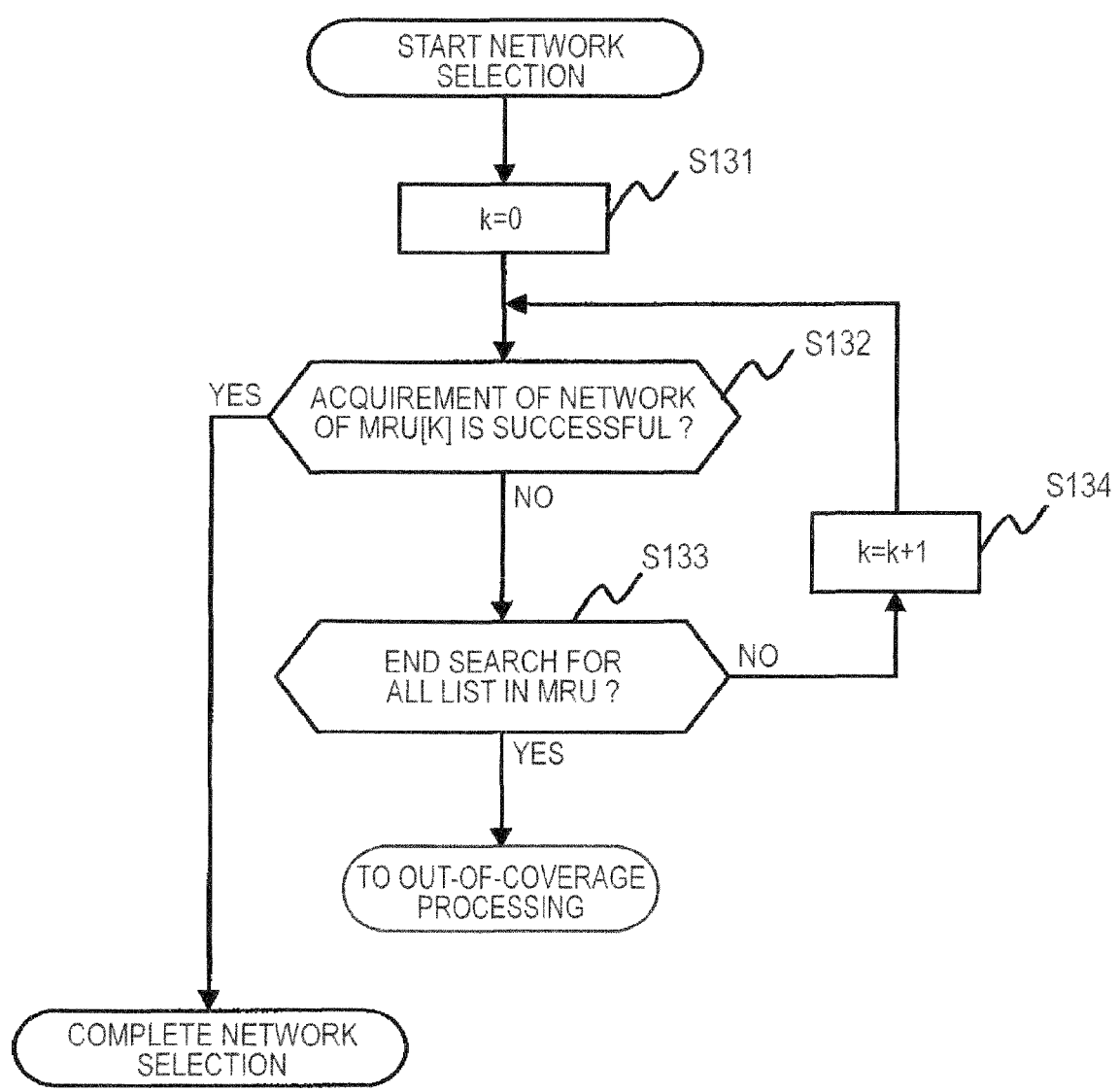
FIG. 6 is an exemplary flowchart showing a processing for selecting a mobile communications network using the MRU list of the mobile apparatus according to the embodiment of the invention.

FIG. 6 is a flowchart showing a processing for selecting a mobile communications network using the MRU list. When detecting that an operation for turning ON the power supply again or an operation for canceling an offline mode is input through the operating portion 56, the controller 51 starts the mobile communications network selection processing. First of all, a variable k is initialized to be zero (S131). The variable k indicates any number in the MRU list which is possessed by the mobile communications network information subjected to searching.

Then, it is determined whether or not a connection to the mobile communications network can be carried out (a network can be acquired) by using information stored in MPU[k] (S132). If the network can be acquired (Yes in S132), the mobile communications network selection processing is ended and a necessary waiting operation is started. On the other hand, if the connection to the mobile communications network cannot be carried out (the network cannot be acquired) and the MRU list has information to which reference has not been made (No in S133), the variable k is incremented by one and the processing after the Step S132 are repeated. On the other hand, if the network cannot be acquired even if reference is made to the information about all the mobile communications networks registered in the MRU list (Yes in S133), the mobile communications network selection processing through the MRU list is ended and a transition to an out-of-area processing is carried out. The out-of-area processing is a processing to search mobile communications network to regain various service provided by mobile communications network. In the out-of-area processing, a mobile communications network search for a return into coverage is intermittently performed in order to reduce a consumed power of a terminal.

When a reconnection to the mobile communications system is carried out, thus, a higher rank of the MRU list is preferentially selected and connected to the mobile communications network. By moving, to the highest rank of the MRU list, the mobile communications network information about the conventional radio access method shown in FIG. 4 when carrying out the detachment or carrying out a newly added processing, it is possible to preferentially select the conventional radio access method having wider coverage than the new radio access method having narrower coverage when performing the reconnection to the mobile communications network. Thus, it is possible to shorten a time required for the connection to the mobile communications system after turning ON the power supply.

The update processing of the MRU in the performance of the detachment is not restricted to the processing described with reference to FIG. 4. For example, although the description of the processing for updating the MRU has been given on the assumption that the list number is rearranged in ascending order of the list number which is not subjected to the update in the MRU list before the update when the mobile communications network information registered in the MRU is to be rearranged at the Step S103 or S104, it is also possible to carry out a rearrangement in such a manner that mobile communications network information having the same network ID as that of the mobile communications network information to be registered in MRU[0] is positioned in a high rank (after MRU[1]) if any. At this time, if a plurality of mobile communications network information has the same network ID as that of the mobile communications network information to be registered in MRU[0] they are rearranged to be positioned in a higher rank through different radio access methods (radio access technology) from MRU[0].

For example, it is assumed that new mobile communications network information which is not present in the MRU list is registered in MRU[0] when information shown in FIG. 7A is stored in the MRU list. If the network ID of the mobile communications network information to be registered in MRU[0] is aaa/bbb, any of the mobile communications network information contained in the MPU list before the update which has the network ID of aaa/bbb is searched. In the example of FIG. 7A, MRU[0] and MRU[n-2] before the update correspond to the information. Therefore, the MPU list is updated in such a manner that MRU[0] and MRU[n-2] before the update are positioned in a high rank. If an radio access method of the mobile communications network information to be registered newly and additionally is cdma2000, MRU[0] before the update with an LTE to be the radio access method is rearranged in a higher rank than MRU[n-2] in order to select mobile communications network information having, as radio access method information, an LTE to be a different radio access method with priority. As a result of the rearrangement, an MRU list shown in FIG. 7B is obtained.

Consequently, the mobile communications network information about the conventional radio access method which has been taking the synchronization just before the detachment processing is registered in the highest rank, and furthermore, mobile communications network information having the same network ID as that of the mobile communications network information registered in the highest rank is registered in a high rank. Even if a connection of the mobile communications network based on the mobile communications network information in the highest rank ends in a failure in the selection of the mobile communications network, therefore, a mobile communications network belonging to the same network ID can be searched with priority. Consequently, it is possible to select a desirable mobile communications network. Moreover, mobile communications network information of a different radio access method from the mobile communications network information registered in the highest rank has priority. Even if the mobile communications network information about the conventional radio access method is registered in the highest rank, therefore, a selection of a mobile communications network about the new radio access method can be prevented from being delayed.

Figure 4:
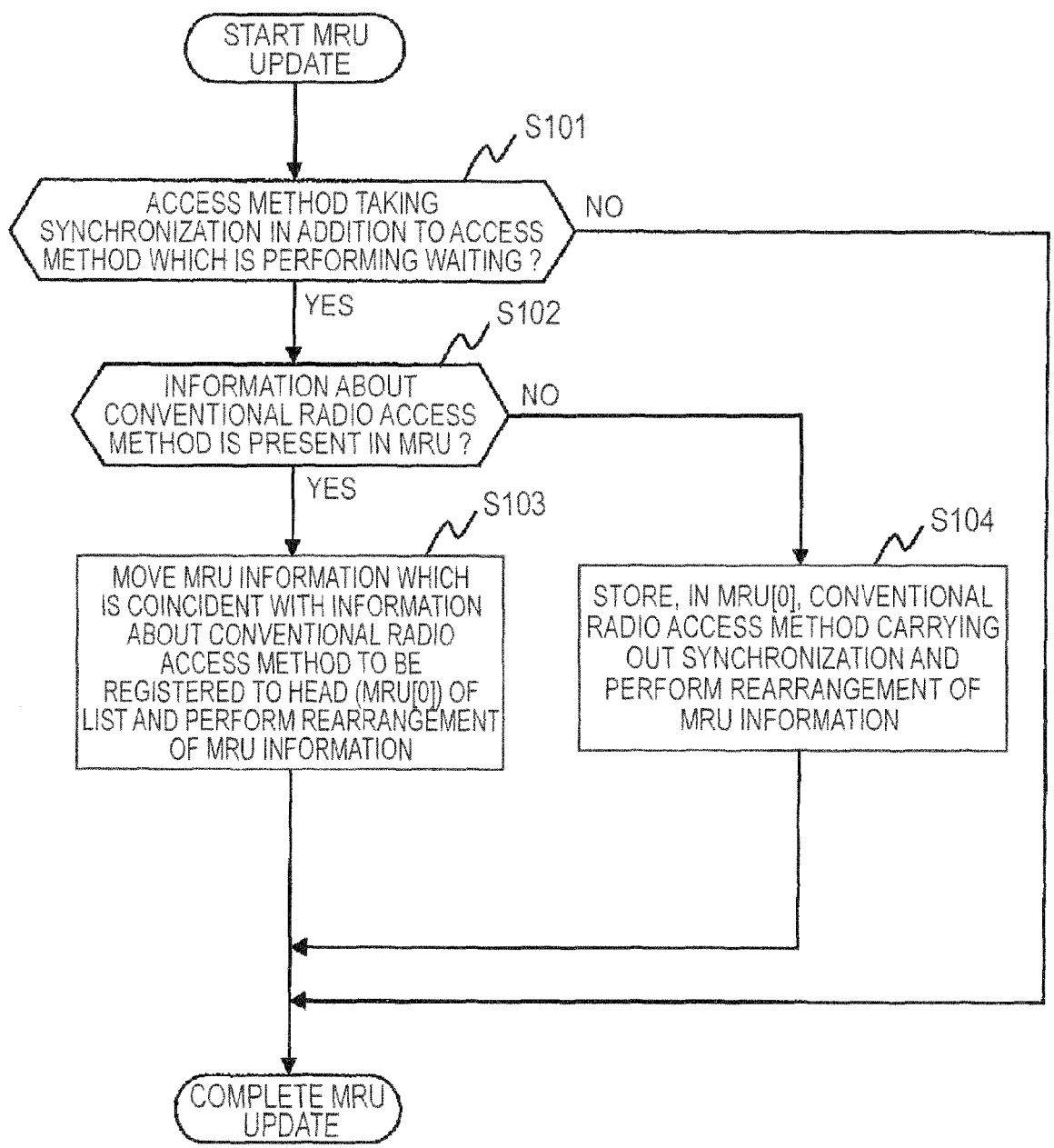
FIG. 4 is an exemplary flowchart showing a processing to be carried out when updating the MRU list by the mobile apparatus according to the embodiment of the invention in association with a detachment.

Although the detachment is simply performed for the new radio access method carrying out the waiting processing in the description of the processing for updating the MRU list in the detachment with reference to FIG. 4, moreover, the detachment may be performed for the conventional radio access method carrying out the synchronization processing.

Figure 8:
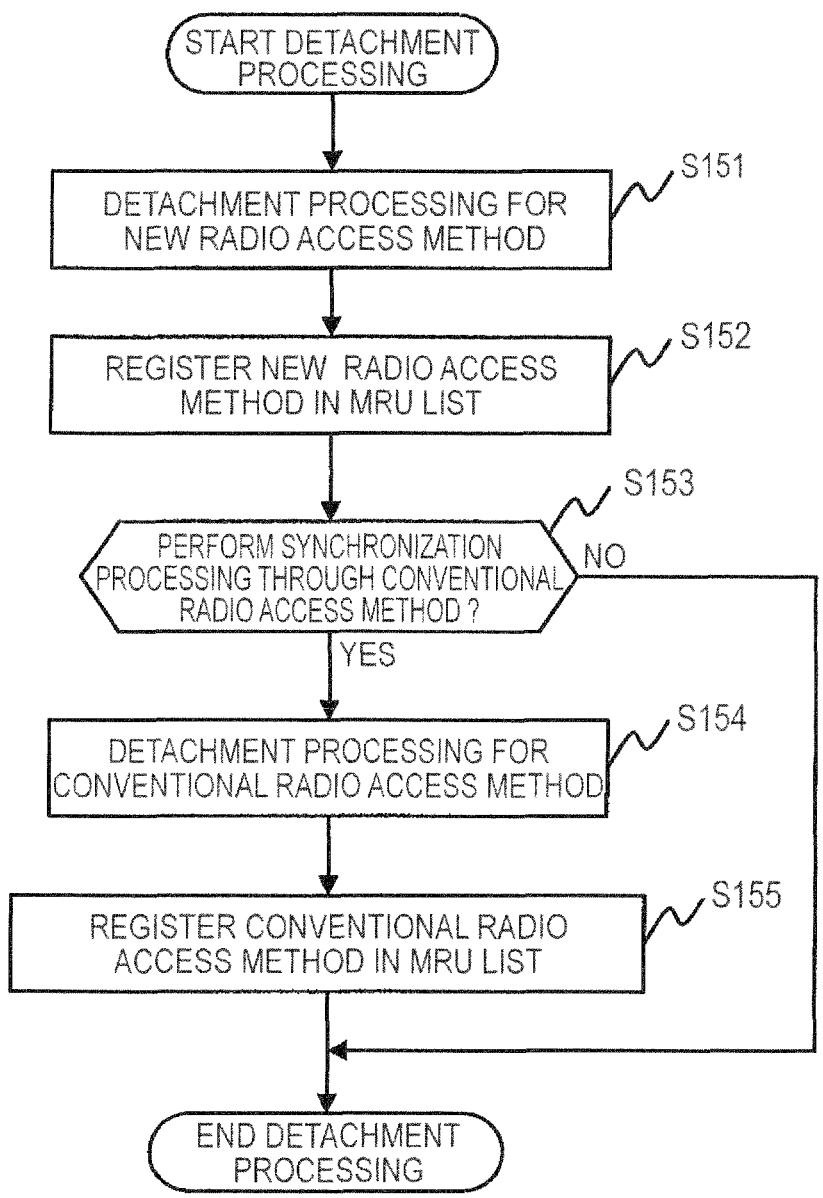
FIG. 8 is an exemplary flowchart showing an MRU update processing in the case in which the mobile apparatus also performs a detachment for a conventional radio access method carrying out a synchronization processing.

FIG. 8 is a flowchart showing the MRU update processing in the case in which the detachment is also performed for the conventional radio access method carrying out the synchronization processing. When determining that a power OFF key operation or an offline mode selecting operation for carrying out a disconnection from the mobile communications network is input through the operating portion 56, the controller 51 first starts the detachment processing using the new radio access method (S151). Then, the mobile communications network information about the new radio access method is registered in the highest rank of the MRU list (S152). If the mobile communications network information about the new radio access method which is to be registered in the highest rank has already been registered in the MRU list, alternatively, the rank of the MRU list is changed to set the mobile communications network information into the highest rank.

Subsequently, it is determined whether or not the synchronization processing is carried out by the conventional radio access method simultaneously with the performance of the waiting processing through the new radio access method (S153). If the synchronization processing is carried out by the conventional radio access method (Yes in S153), the detachment processing is also performed for the conventional radio access method (S154). Thereafter, the mobile communications network information about the conventional radio access method is registered in the highest rank of the MRU list (S155). If the mobile communications network information about the conventional radio access method which is to be registered in the highest rank has already been registered in the MRU list, alternatively, the rank of the MRU list is changed to set the mobile communications network information into the highest rank. The processing of the Step S155 is performed so that the mobile communications network information about the new radio access method which is set into the highest rank in the Step S152 is moved down and is set into MRU[1].

By updating the MRU list because of the detachment, thus, it is possible to automatically add, into the MRU list, the mobile communications network information about the conventional radio access method as well as the mobile communications network information about the new radio access method also when the detachment is to be carried out for the respective access methods. By selecting the mobile communications network using the MRU list updated through the processing in a reconnection to the mobile communications network, therefore, it is possible to first select the conventional radio access method having a high possibility to establish connection to mobile communications network because of large coverage, thereby trying the connection of the mobile communications network. Thus, it is possible to shorten a time required from the power-ON operation to the connection of the mobile communications network.

The MRU list to be updated by moving the mobile communications network information about the conventional radio access method into the highest rank at time of the detachment or carrying out the new addition processing can also be used for a processing other than the determination of the order for trying the connection of the mobile communications network in the reconnection to the mobile communications system. For example, by using the MRU list, it is also possible to change a search frequency in performance of an out-of-area processing.

Figure 9:
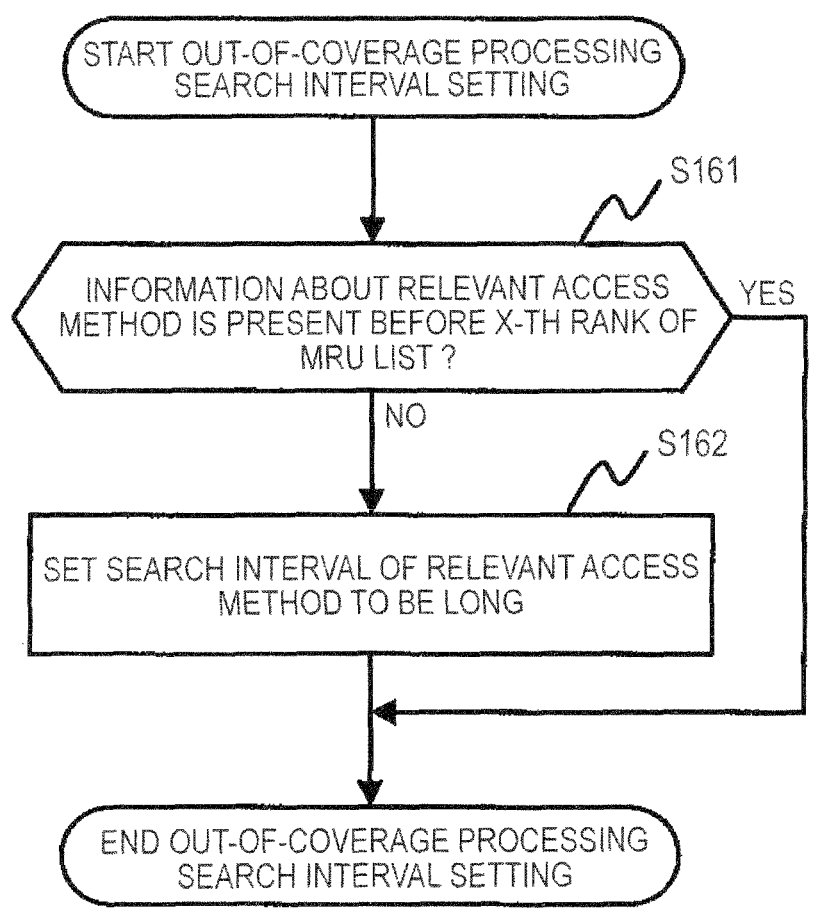
FIG. 9 is an exemplary flowchart showing a processing for setting a search interval in an out-of-area processing by the mobile apparatus according to the embodiment of the invention.

FIG. 9 is a flowchart showing a processing for setting a search interval in the out-of-area processing. When starting the processing for setting the search interval of the out-of-area processing, the controller 51 confirms whether the information about the radio access method for setting the search interval is included within a higher x-th rank of the MRU list or not (S161). "x" represents a preset value and is set to be a value which can be determined to be used recently.

When x=1 is set, it is able to be determined whether a radio access method is used most recently or not. If confirmation that the information is included within the higher x-th rank of the MRU list is made (Yes in S161), the radio access method is determined to be used recently. Therefore, the search interval of the radio access method is not changed. On the other hand, if the information is not included within the higher x-th rank of the MRU list (No in S161), the radio access method is determined not to be used recently. Therefore, the search interval of the radio access method (a time between a certain search and a next search) is set to be long and a frequency of the search of the radio access method is thus reduced (S162).

By decreasing the search for the radio access method determined not to be connected recently, consequently, it is possible to carry out an efficient search in out-of-area, thereby reducing a consumed power.

The search interval in the out-of-area processing may be determined depending on whether or not the information about the radio access method for setting the search interval is included in a second position from a top of the MPU list, that is, MRU[1]. The reason is as follows. A search using information included in the top of the MRU list, that is, MRU[0] has already been performed. In addition, since the newest information about a past connecting destination is ranked higher in the MRU list, there is also a possibility that third (MRU[2]) or fourth (MRU{3}) information from the top might be old information which is far from a current time.

Figure 10:
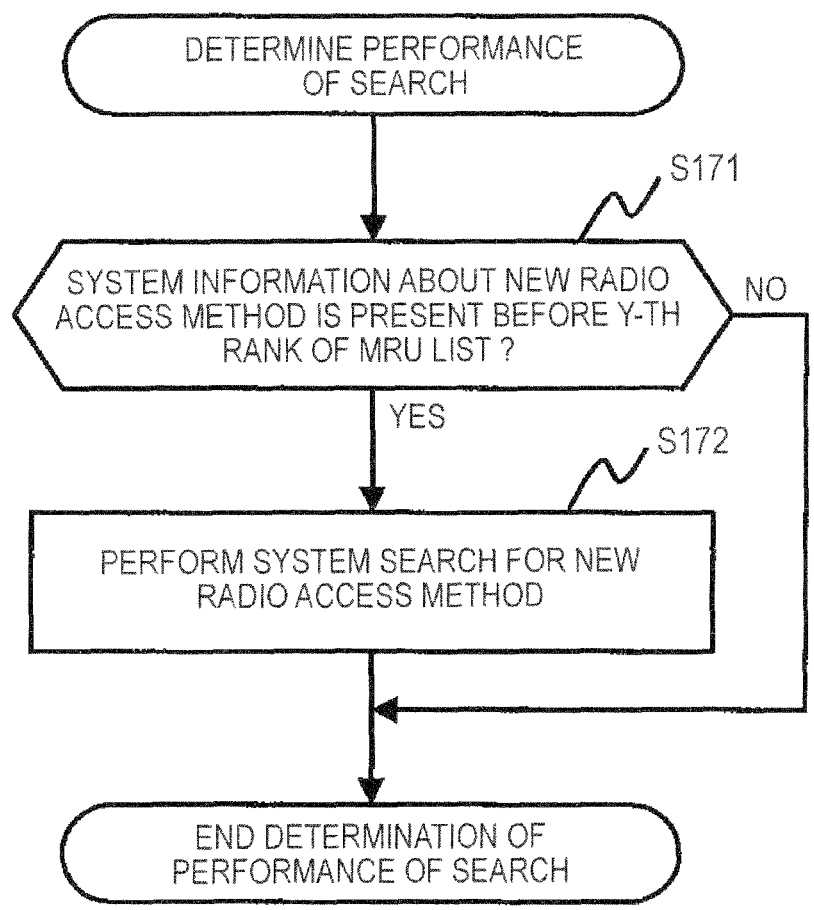
FIG. 10 is an exemplary flowchart showing a processing for determining whether a search for a new radio access method is performed by the mobile apparatus or not.

When performing the waiting processing through a certain access method by using the MRU list, moreover, it is possible to determine whether a search for another access method is carried out or not. For example, FIG. 10 is a flowchart showing a processing for determining whether a search for a new radio access method is performed or not while the waiting processing is performed through the conventional radio access method. When a determination processing for the performance of the search is started while the waiting processing is carried out by the conventional radio access method, the controller 51 confirms whether or not mobile communications network information about the new radio access method is stored before a higher y-th rank excluding the highest rank of the MRU list (S171). The mobile communications network information in the highest rank is information about a system which is performing the waiting processing. Therefore, the highest rank does not need to be confirmed. Moreover, "y" represents a preset value and is set to be a value which can be determined to be used recently. If y=1 is set, it is possible to confirm whether the new radio access method is most recently used based on information in a first higher rank excluding the highest rank of the MRU list, that is, MRU[1]. If the mobile communications network information about the new radio access method is stored within the higher y-th rank excluding the highest rank of the MRU list (Yes in S171), a system search for a mobile communications system using the new radio access method is performed (S172).

Also, by thus using the MRU list, when information indicative of the presence of the new radio access method is not notified while the waiting processing is carried out by the conventional radio access method, it is possible to properly determine a possibility that the new radio access method might be present, and to perform the system search for the new radio access method.

As described above, in the embodiment, it is possible to quickly establish the connection to the mobile communications system when the power supply is turned on again, when mobile communications network information about a radio access method having large coverage providing a circuit switching service is registered in the MRU in the case in which a connection to or synchronization with systems is taken in the detachment processing for disconnecting the mobile apparatus from the mobile communications system.

Second Embodiment

A mobile apparatus according to a second embodiment of the invention has the same configuration as that described in the first embodiment and is capable of using a plurality of access methods in the same manner as in the first embodiment. Description will be given on the assumption that it is possible to use two access methods including a new radio access method and a conventional radio access method of a circuit switching method. An MRU list includes an MRU 1 for registering mobile communications network information about the new radio access method and an MRU 2 for registering mobile communications network information about the conventional radio access method. In other words, the MPU 1 list registers only the mobile communications network information about the new radio access method and does not register the mobile communications network information about the conventional radio access method. Similarly, the MRU 2 list registers only the mobile communications network information about the conventional radio access method and does not register the mobile communications network information about the new radio access method. The MRU 1 list and the MRU 2 list register network information (a network ID), a radio access method to be used (an access system), frequency band information to be used, and information about a central frequency which is used by the access method (see "CDMA Development Group Document #143").

Figure 11:
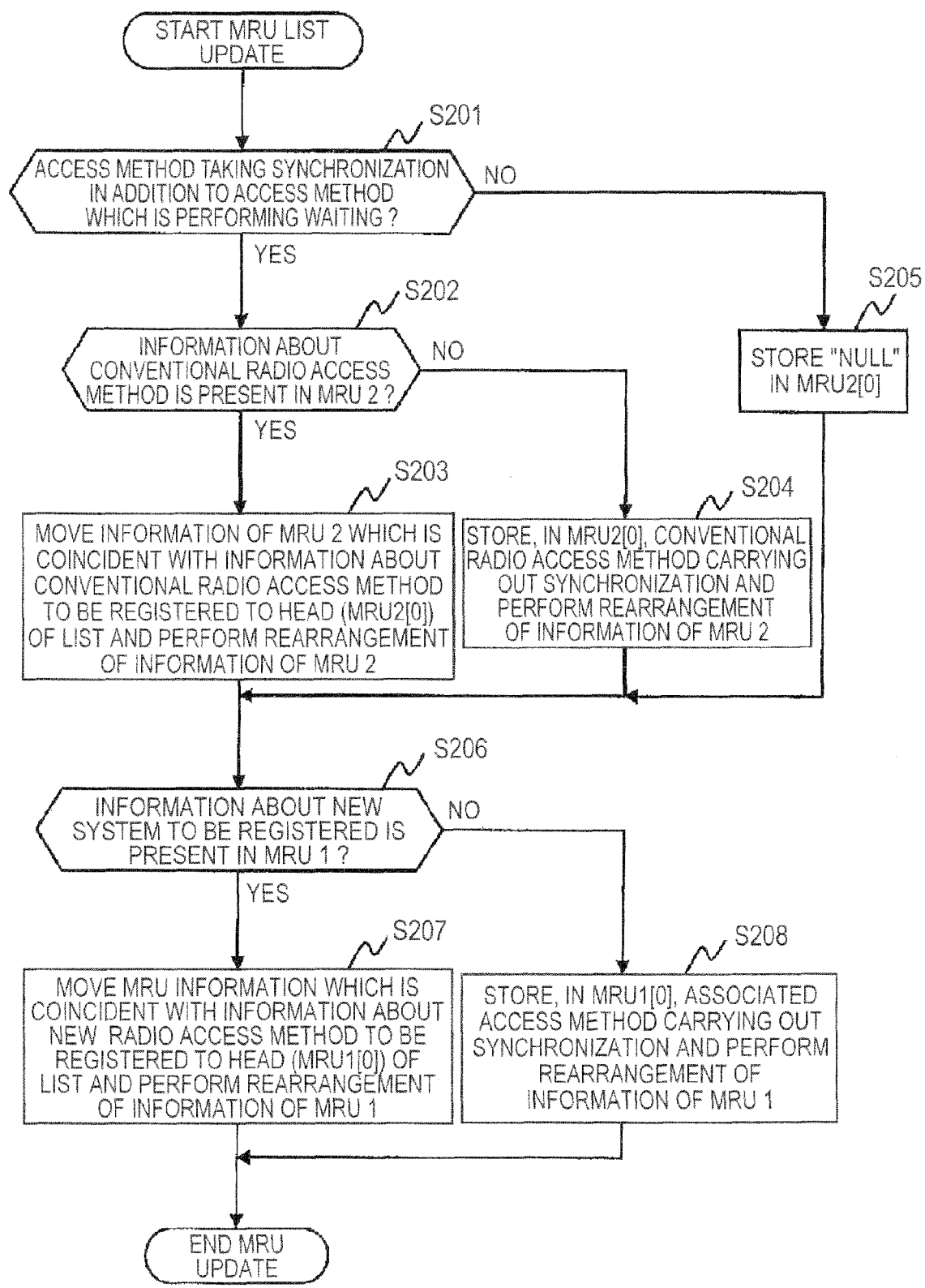
FIG. 11 is an exemplary flowchart showing a processing for updating the MRU list when the mobile apparatus has two MRU lists.

FIG. 11 is a flowchart showing a processing for updating an MRU list in a case in which a mobile apparatus 1 has the two MRU lists.

When determining that a power OFF key operation or an offline mode selecting operation for carrying out a disconnection from a mobile communications network is input through an operating portion 56, a controller 51 performs a detachment. At this time, if waiting is carried out by a new radio access method, the controller 51 confirms whether or not a conventional radio access method carrying out a synchronization processing is present in addition to the new radio access method which is performing the waiting (S201). In the embodiment, the case in which the conventional radio access method is not present (No in S201) includes the case in which only coverage of the new radio access method is present and a cell of the conventional radio access method is not present and the case in which a synchronization with the conventional radio access method cannot be taken for some reason. In this case, "NULL" is added as information about the highest rank of the MRU 2 which is a list for registering the mobile communications network information about the conventional radio access method (S205). By adding the "NULL", thus, it is possible to obtain, from the MRU 2 list, information that the conventional radio access method is not present in the performance of the detachment for the new radio access method at this time.

On the other hand, if the conventional radio access method is present (Yes in S201), the controller 51 compares the information about the conventional radio access method with the mobile communications network information registered in the MRU 2 list and determines whether coincident information is present or not (S202). Referring to the determination of the coincidence, a determination of "coincidence" is made based on a coincidence of all of the information including the network information registered in the MRU 2 list, the access system to be used, the frequency band information to be used and the central frequency to be used by the access system.

If the mobile communications network information about the conventional radio access method taking the synchronization is coincident with one of the mobile communications network information registered in the MRU 2 list at the Step S202 (Yes in S202), the controller 51 changes any of the mobile communications network information which is registered in the MRU 2 list and is coincident with the mobile communications network information about the conventional radio access method taking the synchronization to obtain a head (MRU2[0]) of the list and rearranges a list number in ascending order of MRU2[1], MRU2[2] . . . for the other mobile communications network information stored in the MRU 2 list (S203).

On the other hand, if the mobile communications network information about the conventional radio access method taking the synchronization is not coincident with any of the mobile communications network information registered in the MRU 2 list at the Step S202 (No in S202), the controller 51 registers the mobile communications network information about the conventional radio access method taking the synchronization in MRU2[0] in the highest rank of the MRU 2 list and rearranges the list number in the ascending order of MRU[1], MRU2[2] . . . for the mobile communications network information which have already been registered in the MRU 2 list (S204). In the case in which a limitation that can be stored in the MRU 2 list is exceeded by the registration of new mobile communications network information in the MPU 2 list, moreover, mobile communications network information having a last number through the rearrangement of the list numbers is deleted.

Through the processing of the Steps S201 to S205, it is possible to update the MRU 2 list for registering the mobile communications network information about the conventional radio access method.

Subsequently, the mobile communications network information about the new radio access method which is performing the waiting is compared with the mobile communications network information registered in the MRU 1 list and it is determined whether coincident information is present or not (S206). Referring to the determination of the coincidence, a determination of "coincidence" is made based on a coincident of all of the information including the network information registered in the MRU 1 list, the access system to be used, the frequency band information to be used, and the central frequency to be used by the access system.

If the mobile communications network information about the new radio access method performing the waiting is coincident with one of the mobile communications network information registered in the MRU 1 list (Yes in S206), the controller 51 charges any of the mobile communications network information which is registered in the MRU 1 list and is coincident with the mobile communications network information about the new radio access method performing the waiting to obtain a top of the list (MRU1[0]) and rearranges the list number in ascending order of MRU1[1], MRU1[2] . . . for the other mobile communications network information stored in the MRU 1 list (S207).

On the other hand, if the mobile communications network information about the new radio access method performing the waiting is not coincident with any of the mobile communications network information registered in the MRU 1 list at the Step S206 (No in S206), the controller 51 registers the mobile communications network information about the new radio access method performing the waiting in MRU1[0] in the highest rank of the MRU 1 list and rearranges the list number in the ascending order of MRU1[1], MRU1[2] ... for the mobile communications network information which have already been registered in the MRU 1 list (S208). When a limitation that can be stored in the MRU 1 list is exceeded by the registration of new mobile communications network information in the MRU 1 list, moreover, mobile communications network information having a last number through the rearrangement of the list numbers is deleted.

Through the processing of the Steps S206 to S208, it is possible to update the MRU 1 list for registering the mobile communications network information about the new radio access method.

By the processing shown in FIG. 11, both the MRU 1 list and the MRU 2 list are completely updated in the detachment. Although the processing of the MRU 2 list registering storage information about the conventional radio access method is performed earlier and the processing of the MRU 1 list registering storage information about the new radio access method is performed later in FIG. 11, these processing can also be performed with order changed. More specifically, in FIG. 11, the processing of the Steps S206 to S208 can be performed earlier and the processing of the Steps S201 to S205 can be performed later.

Next, a processing for selecting a mobile communications network using the MRU 1 list and the MRU 2 list will be described with reference to FIG. 12. The mobile apparatus 1 having a plurality of MRU lists previously carries out ranking for the MRU list. The rank is set in such a manner that the conventional radio access method having large coverage is in a higher rank. Based on the rank, a mobile communications network is selected in a reconnection to the mobile communications system.

When detecting that an operation for turning ON a power supply again or an offline mode canceling operation is input through the operating portion 56, the controller 51 starts a mobile communications network selection processing. The controller 51 first initializes, into zero, a variable k indicative of any number of the MRU list possessed by the mobile communications network information which has been searched (S231). Then, it is determined whether or not "NULL" is registered as any of information registered in the MRU 2 list to be the MRU list for the conventional radio access method which is indicated by the variable k (S232).

If the "NULL" is not registered (No in S232), a connection to a mobile communications network (an acquirement of a network) is tried by using the mobile communications network information in the MRU 2 list for the conventional radio access method which is indicated by the variable k (S233).

If the acquirement of the network is successful (Yes in S233), the processing for selecting the mobile communications network is ended and a necessary waiting operation is started. On the other hand, when the network cannot be acquired or when the mobile communications network information registered as MRU2[k] is not present (No in S233), the acquirement of the network is tried by using the mobile communications network information of the MRU 1 list for the new radio access method which is indicated by the variable k (S234).

When the acquirement of the network is successful (Yes in S234), the processing for selecting the mobile communications network is ended and the waiting operation is started. On the other hand, in the case in which the network cannot be acquired by using the MRU 1 list for the new radio access method or the case in which the mobile communications network information registered as MRU1[k] is not present (No in S234), it is determined whether a search for all of the mobile communications network information stored in both the MRU 1 list for the new radio access method and the MRU 2 list for the conventional radio access method is ended or not (S235).

If the search is not ended (No in S235), the variable k is incremented by one and the processing after the Step S233 are repeated. If the search for all of the mobile communications network information in the MRU 1 list and the MRU 2 list is ended (Yes in S235), the acquirement of the network is not successful even if reference is made to all of the MRU lists. Therefore, the selection of the mobile communications network using the MPU list is abandoned and a transition to an out-of-coverage processing is carried out. In the out-of-coverage processing, a mobile communications network search for a return into a coverage is intermittently performed in order to reduce a consumed power of the terminal.

On the other hand, if the "NULL" is registered as the mobile communications network information in the MRU 2 list which is indicated by the variable k at the Step S232, the controller 51 can determine that a synchronization with the conventional radio access method is not taken, and does not select the mobile communications network information of the MRU 2 list for the conventional radio access method at subsequent processing steps. Therefore, reference is first made to k-th mobile communications network information of the MRU 1 list for the new radio access method to determine whether the acquirement of the network is successful by using the mobile communications network information or not (S237).

If the acquirement of the network is successful at the Step S237 (Yes in S237), the processing for selecting the mobile communications network is ended and a waiting operation is started. On the other hand, in the case in which the network cannot be acquired at the Step S237 or the case in which the mobile communications network information registered as MRU1[k] is not present (No in S237), it is determined whether reference is made to all of the mobile communications network information registered in the MRU 1 list or not (S238).

If reference is not made to any of the mobile communications network information registered in the MRU 1 list (No in S238), the variable k is incremented by one (S239) and the processing after the Step S237 are repeated. On the other hand, if the acquirement of the network is not successful even if reference is made to all of the mobile communications network information registered in the MRU 1 list (Yes in S238), the selection of the mobile communications network using the MRU list is given up and the transition to the out-of-coverage processing is carried out.

By using the processing for updating the MRU 1 list and the MRU 2 list and the processing for selecting the mobile communications network utilizing the MRU 1 list and the MRU 2 list as described above, it is possible to preferentially use, for the selection of the mobile communications network, the mobile communications network information stored in the MRU 2 list for the conventional radio access method. The reason is as follows. In the processing for selecting the mobile communications network shown in FIG. 12, the Step S233 is performed earlier than the Step S234. Consequently, in comparison of the k-th mobile communications network information stored in the MRU 1 list for the new radio access method with the k-th mobile communications network information stored in the MRU 2 list for the conventional radio access method, acquiring the network using the mobile communications network information stored in the MRU 2 list for the conventional radio access method is made earlier. Thus, it is possible to select the mobile communications network by using the conventional radio access method having large coverage in a reconnection to the mobile communications system. Consequently, it is possible to shorten a time required from an input of an instruction for the reconnection of the network through the operating portion 56 to the connection to the mobile communications system.

Figure 12:
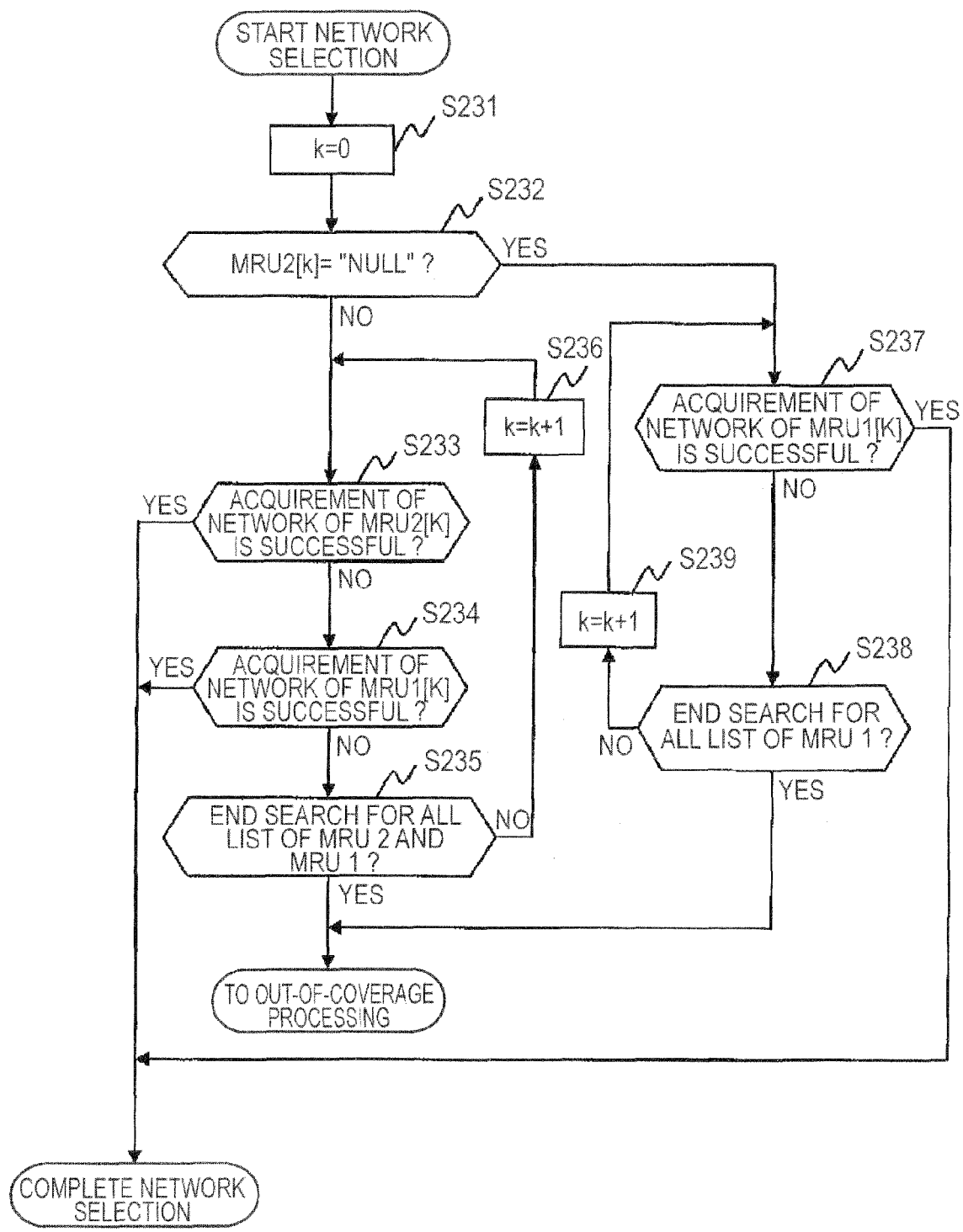
FIG. 12 is an exemplary flowchart showing a processing for selecting a mobile communications network to be carried out by using the two MRU lists through the mobile apparatus.

In the processing shown in FIG. 12, moreover, the MRU 2 list for the conventional radio access method and the MRU 1 list for the new radio access method are alternately utilized in such a manner that the order of the use in the mobile communications network selection is set into MRU2[k], MRU1[k], MRU2[k+1], MRU1[k+1] . . . . Therefore, in an environment in which one of the access methods cannot be used at all, it is possible to prevent a useless operation for selecting a mobile communications network from being generated by using only the mobile communications network information for the access method which cannot be used. Thus, it is possible to eliminate a loss of a time required for the connection to the mobile communications system.

Also in the case in which the processing for selecting the mobile communications network using the MRU 1 list and the MRU 2 list is taken so that coverage for the new radio access method will be enlarged in the future and a service of the conventional radio access method is stopped, furthermore, it is possible to carry out the processing for selecting the mobile communications network using only the MRU 1 list for the new radio access method without selecting the conventional radio access method when the "NULL" is registered in the highest rank in the update of the MRU 2 list to carry out the processing for selecting the mobile communications network. Thus, the MRU 2 list for the conventional radio access method which is abolished can be set to be unused in the selection of the mobile communications network. Therefore, it is possible to efficiently select the mobile communications network.

Also in the embodiment, the processing for updating the MRU in the performance of the detachment is not restricted to the processing described with reference to FIG. 11. In the same manner as in the description of the first embodiment, the mobile communications network information having the same network ID as that of the mobile communications network information registered in the highest rank of the list may be rearranged in the high rank when the rearrangement of the MRU list is to be performed. When there is registered a plurality of mobile communications network information having the same network ID as that of the mobile communications network information registered in the highest rank of the MRU list, the mobile communications network information set into the higher rank in the MRU list before the update are also rearranged into the higher rank in the MRU list after the update.

Also in the embodiment, the detachment may be performed for the conventional radio access method carrying out a synchronization processing in addition to the detachment for the new radio access method carrying out waiting.

Figure 13:
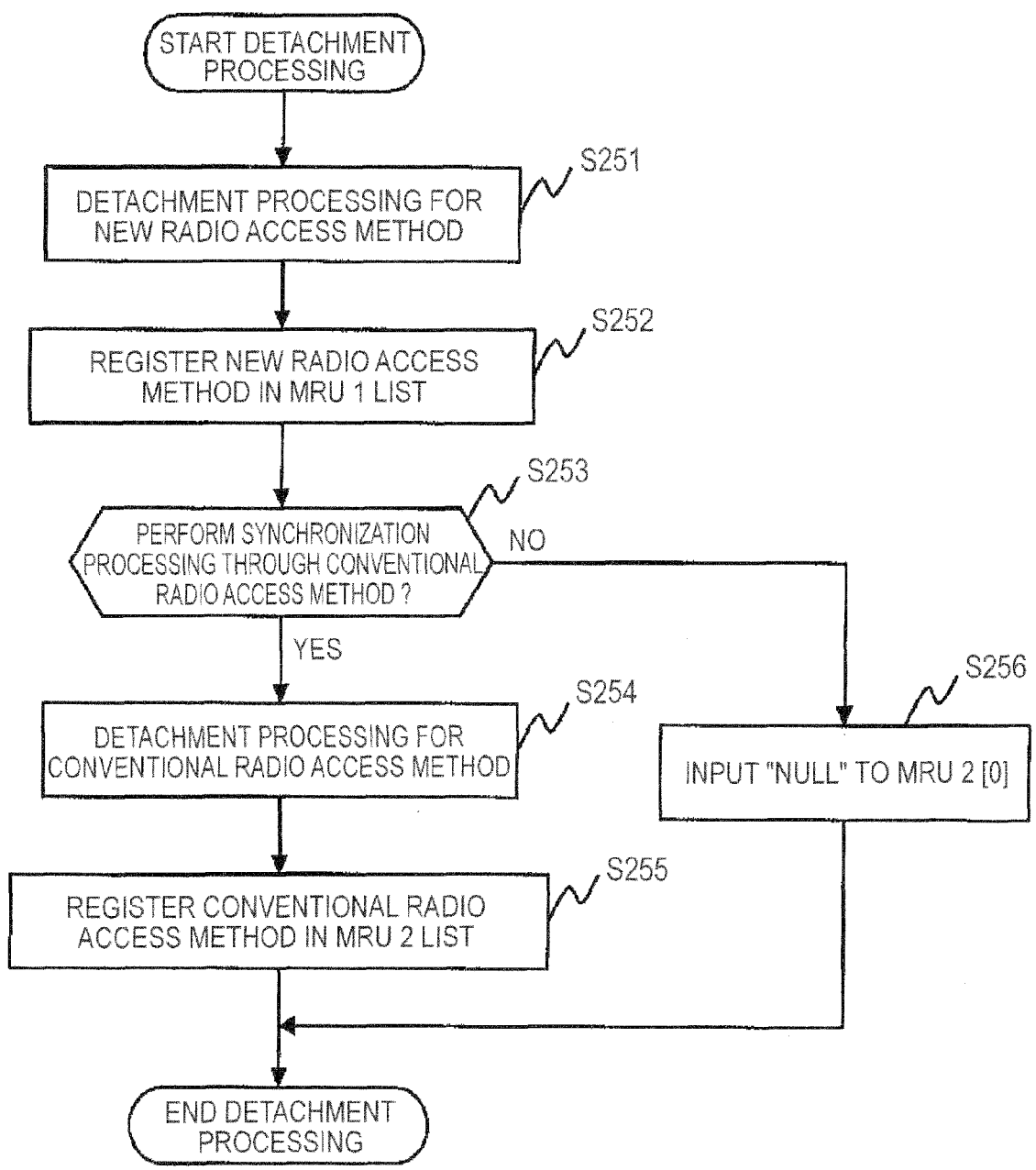
FIG. 13 is an exemplary flowchart showing an MRU update processing when the mobile apparatus according to the embodiment of the invention also performs the detachment for the radio access method carrying out the synchronization processing.

FIG. 13 is a flowchart showing an MRU update processing in the case in which the detachment is also performed for the conventional radio access method carrying out the synchronization processing in addition to the detachment for the new radio access method carrying out the waiting in the mobile apparatus 1 having a plurality of MRU lists as in the embodiment.

When determining that a power OFF key operation or an offline mode selecting operation for carrying out a disconnection from the mobile communications system is input through the operating portion 56, the controller 51 first starts a detachment processing for the new radio access method (S251). Then, there is carried out a processing for registering the mobile communications network information about the new radio access method in the highest rank of the MRU 1 list (S252). When the mobile communications network information about the new radio access method which is to be registered in the highest rank has already been registered in the MRU 1 list, alternatively, the rank of the MRU 1 list is changed in such a manner that the mobile communications network information is set into the highest rank. Since the processing of the Step S252 is the same as the processing of the Steps S202 to S204 described with reference to FIG. 11, detailed description will be omitted.

Subsequently, it is determined whether the synchronization processing is carried out by the conventional radio access method simultaneously with the performance of the waiting processing through the new radio access method (S253). If the synchronization processing is carried out by the conventional radio access method (Yes in S253), the detachment processing is also performed for the conventional radio access method (S254). Then, the mobile communications network information about the conventional radio access method is registered in the highest rank of the MRU 2 list (S255). When the mobile communications network information about the conventional radio access method which is to be registered in the highest rank has already been registered in the MRU 2 list, alternatively, the rank of the MRU 2 list is changed in such a manner that the mobile communications network information is set into the highest rank. Since the processing of the Step S255 is the same as the processing of the Steps S206 to S208 described with reference to FIG. 11, detailed description will be omitted.

If it is determined that the synchronization with the conventional radio access method cannot be taken at the Step S253 (No in S253), "NULL" is added as the information in the highest rank of the MRU 2 to be the list for registering the information about the conventional radio access method (S256).

Although the detachment for the new radio access method and the MRU 1 list registration processing associated therewith are performed earlier and the detachment for the conventional radio access method and the MRU 2 list registration processing associated therewith are performed later in FIG. 13, the processing can also be performed with the order changed. More specifically, in FIG. 13, the processing of the Steps S253 to S256 can be performed earlier and the processing of the Steps S251 to S252 can be performed later.

Also when the detachment is to be carried out for the respective access methods through the processing described above, it is possible to automatically add, into the MRU list, the mobile communications network information about the conventional radio access method in addition to the mobile communications network information about the new radio access method. Therefore, it is possible to preferentially select either of the access methods which has larger coverage, thereby carrying out a processing for connecting the mobile communications network in the reconnection to the mobile communications system.

The invention is not restricted to the embodiments but may be properly changed without departing from the scope thereof. For example, although the description has been given on the assumption that the mobile apparatus can use two access methods in the embodiments, at least three access methods may be used. Although the description has been given to the processing in the state in which the synchronization processing is carried out by the conventional radio access method while the waiting processing is performed by the new radio access method in the embodiments, for example, it is sufficient that the synchronization processing is carried out at a minimum in the conventional radio access method, and the waiting processing may be carried out in addition to the synchronization processing.

What is claimed is:

1. A mobile apparatus comprising:
a first communication module configured to communicate with a first base station of a first mobile communications network through a first radio access method;
a second communication module configured to communicate with a second base station of a second mobile communications network through a second radio access method,
the second communication module configured to provide a circuit switching service;
a memory to store a Most Recently Used (MRU) list; and
a control module configured to update information of the MRU list stored in the memory about the second mobile communications network when the first communication module carries out a waiting processing and the second communication module carries out a synchronization processing,
wherein the control module is configured to assign a highest rank in the MRU list to an information item of the second mobile communications network which is currently present for registration in the MRU list during the synchronization processing of the second communication module, when the currently present information item is already registered in the MRU list stored in the memory, and configured to control the memory to store the MRU list in which ranks of information items other than the currently present information item are rearranged to follow the highest rank.

2. The mobile apparatus of claim 1, wherein the control module is configured to control the memory to store the information about the second mobile communications network when a detachment processing for the first mobile communications network or the second wireless communications network is carried out.

3. The mobile apparatus of claim 1, wherein the control module is configured to control the memory to store the information about the second mobile communications network after a detachment processing for the first mobile communications network is carried out.

4. The mobile apparatus of claim 1, wherein the control module is configured to control the memory not to additionally store the information about the second mobile communications network when the information is already stored in the memory.

5. The mobile apparatus of claim 1, wherein:
the memory is configured to store ranked information; and
the control module is configured to control the memory to store the information about the second mobile communications network in a high rank after a detachment processing for the first mobile communications network is carried out.

6. The mobile apparatus of claim 1, wherein:
the memory is configured to store ranked information; and
the control module is configured to control the memory to set certain information in a high rank when the certain information has the same network ID as that of highest-rank-information and the certain information is stored in the memory, the highest-rank-information being about a mobile communications network to be stored in the highest rank.

7. The mobile apparatus of claim 6, wherein:
the control module is configured to control the memory to set information about a mobile communications network having a different communication method from that of the highest-rank-information in a higher rank when a plurality of information having the same network ID as that of the highest-rank-information is stored in the memory.

8. The mobile apparatus of claim 1, wherein the memory is configured to store information about a mobile communications network for a different wireless communication method in the same storage area.

9. The mobile apparatus of claim 5, further comprising:
a selection module configured to try a selection of a mobile communications network in order from a higher rank in the memory; and
a search frequency changing module configured to change a frequency of a search for a mobile communications network depending on whether a mobile communications network to be selected is included within a threshold rank from, the higher rank in the information stored in the memory or not.

10. The mobile apparatus of claim 5, further comprising:
a selection module configured to try a selection of a mobile communications network in order from a higher rank in the memory; and
a search frequency changing module configured to change a frequency of a search for a mobile communications network depending on whether information about a mobile communications network to be selected is stored in a second highest rank in the memory or not.

11. The mobile apparatus of claim 5, further comprising a search determination module configured to determine to perform a search for a mobile communications network for a different wireless communication method from a wireless communication method carrying out the waiting processing depending on whether or not a mobile communications network having a wireless communication method to be a determination target for the search is stored within a threshold number from a higher rank excluding the highest rank in the memory.

12. The mobile apparatus of claim 5, further comprising search determination module configured to determine to perform a search for a mobile communications network for a different wireless communication method from a wireless communication method carrying out the waiting processing depending on whether or not a mobile communications network having a wireless communication method to be a determination target for the search is stored in a second highest rank in the memory.

13. A mobile apparatus comprising:
a first communication module configured to communicate with a first base station of a first mobile communications network through a first wireless communication method;
a second communication module configured to communicate with a second base station of a second mobile communications network through a second wireless communication method, the second communication module configured to provide a circuit switching service;
a first memory to store a first Most Recently Used (MRU) list regarding the first mobile communications network;
a second memory to store a second MRU list regarding the second mobile communications network; and
a control module configured to update, when the first communication module carries out a waiting processing and a detachment processing for the first mobile communications network is carried out, first information of the first MRU list stored in the first memory about the first mobile communications network, and configured to update second information of the second MRU list stored in the second memory about the second mobile communications network when the second communication module carries out a synchronization processing, wherein the control module is configured to assign a highest rank in the second MRU list to an information item of the second mobile communications network which is currently present for registration in the second MRU list during the synchronization processing of the second communication module, when the currently present information item is already registered in the second MRU list stored in the memory, and configured to control the memory to store the MRU list in which ranks of information items other than the currently present information item are rearranged to follow the highest rank.

14. The mobile apparatus of claim 13, wherein the control module is configured to control the second memory to store certain information indicating that a synchronization was not carried out when the detachment processing for the first mobile communications network is carried out and the synchronization processing is not performed by the second communication module.

15. The mobile apparatus of claim 13, further comprising a network selection module configured to preferentially select the second information than the first information to perform a selection of the mobile communications network.

16. The mobile apparatus of claim 14, further comprising a system selection module configured:
   to preferentially select the second information; and
   not to select the second information when the certain information is stored.

17. The mobile apparatus of claim 13, wherein the control module is configured to:
   respectively perform a detachment processing for the first mobile communications network and a detachment processing for the second mobile communications network; and
   control the first memory and the second memory to respectively store information about the first and the second mobile communications networks.

* * * * *